(12) United States Patent
Dreyer et al.

(10) Patent No.: US 10,865,339 B2
(45) Date of Patent: Dec. 15, 2020

(54) SLOW-RELEASE SCALE INHIBITING COMPOSITIONS

(71) Applicant: Ecolab USA Inc., St. Paul, MN (US)

(72) Inventors: Daniel R. Dreyer, Missouri City, TX (US); Pious V. Kurian, Sugar Land, TX (US)

(73) Assignee: CHAMPIONX USA INC., Sugar Land, TX (US)

( * ) Notice: Subject to any disclaimer, the term of this patent is extended or adjusted under 35 U.S.C. 154(b) by 0 days.

(21) Appl. No.: 15/593,776

(22) Filed: May 12, 2017

(65) Prior Publication Data

US 2017/0327727 A1 Nov. 16, 2017

Related U.S. Application Data

(60) Provisional application No. 62/336,774, filed on May 16, 2016.

(51) Int. Cl.
| | |
|---|---|
| *C09K 8/80* | (2006.01) |
| *C09K 8/528* | (2006.01) |
| *C09K 8/536* | (2006.01) |
| *C09K 8/68* | (2006.01) |
| *C09K 8/88* | (2006.01) |
| *C09K 8/70* | (2006.01) |

(52) U.S. Cl.
CPC .............. *C09K 8/528* (2013.01); *C09K 8/536* (2013.01); *C09K 8/68* (2013.01); *C09K 8/80* (2013.01); *C09K 8/805* (2013.01); *C09K 8/882* (2013.01); *C09K 8/70* (2013.01)

(58) Field of Classification Search
CPC .......... C09K 8/80; C09K 8/805; C09K 8/516; C09K 8/70; C09K 2208/10; C09K 2208/18; C09K 8/82; C09K 8/56; C09K 8/572; C09K 8/528; C09K 8/42; C09K 8/536; C09K 8/68; C09K 8/882; C09K 8/92; C09K 8/62; C09K 2208/04; C09K 2208/20; C09K 2208/22; C09K 8/50; C09K 8/52; E21B 43/04; E21B 43/267; E21B 43/26; E21B 43/08; E21B 43/088; E21B 37/06

See application file for complete search history.

(56) References Cited

U.S. PATENT DOCUMENTS

| | | |
|---|---|---|
| 2,365,489 A | 12/1944 | Partridge |
| 2,437,475 A | 3/1948 | Oxford, Jr. |
| 2,601,395 A | 6/1952 | Hatch |
| 3,272,588 A | 9/1966 | Fuchs |
| 3,284,368 A | 11/1966 | Hatch |
| 3,338,670 A | 8/1967 | Fuchs |
| 3,341,453 A | 9/1967 | Ralston |
| 3,432,428 A | 3/1969 | Wirth et al. |
| 3,476,689 A | 11/1969 | Newman |
| 3,477,956 A | 11/1969 | Stanford et al. |
| 3,480,083 A | 11/1969 | Oleen |
| 3,532,167 A | 10/1970 | Noe, Jr. et al. |
| 3,549,548 A | 12/1970 | Newman |
| 3,584,687 A | 6/1971 | Stanford et al. |
| 3,597,352 A | 8/1971 | Stanford et al. |
| 3,609,092 A | 9/1971 | Smith et al. |
| 3,620,974 A | 11/1971 | Stanford et al. |
| 3,633,672 A | 1/1972 | Smith et al. |
| 3,639,263 A | 2/1972 | Troscinski et al. |
| 3,654,993 A | 4/1972 | Smith et al. |
| 3,720,505 A | 3/1973 | Vogel |
| 3,787,534 A | 1/1974 | Stanford et al. |
| 3,827,977 A | 8/1974 | Miles et al. |
| 3,880,765 A | 4/1975 | Watson |
| 3,931,038 A | 1/1976 | Mochi-Bartolani et al. |
| 3,933,689 A * | 1/1976 | Ray .......................... C03C 3/19 521/138 |
| 3,948,792 A | 4/1976 | Watsen et al. |
| 4,008,164 A | 2/1977 | Watson et al. |
| 4,046,540 A | 9/1977 | Lewis et al. |
| 4,051,110 A | 9/1977 | Quinlan |
| 4,080,375 A | 3/1978 | Quinlan |
| 4,172,032 A | 10/1979 | Farley |
| 4,187,245 A | 2/1980 | Redmore et al. |
| 4,234,511 A | 11/1980 | Buckman |
| 4,291,763 A | 9/1981 | Singer |
| 4,309,485 A | 1/1982 | Kondo et al. |
| 4,326,873 A | 4/1982 | Reilly et al. |
| 4,357,248 A | 11/1982 | Berkshire et al. |

(Continued)

FOREIGN PATENT DOCUMENTS

| | | |
|---|---|---|
| CA | 772 126 A | 11/1967 |
| EP | 0046078 A1 | 2/1982 |

(Continued)

OTHER PUBLICATIONS

Innophos product data sheet downloaded on Oct. 17, 2018.*
R J Powell et al: "SPE 28999 Controlled-Release Scale Inhibitor for Use in Fracturing Treatments", Feb. 17, 1995 (Feb. 17, 1995), XP055386638.*
Coating Place Inc., Wurster Process Applications, </wurster-process-applications/wurster-process-applications.html> retrieved on Jan. 21, 2016, 3 pages.
Coating Place Inc., The Wurster Process, </technologies/the-wurster-process.html> retrieved on Jan. 21, 2016, 3 pages.

(Continued)

*Primary Examiner* — Kumar R Bhushan
(74) *Attorney, Agent, or Firm* — Stinson LLP

(57) ABSTRACT

A coated particulate composition includes a vitreous polyphosphate glass particulate and a coating on at least a portion of the surface of the particulate, the coating comprising a water-insoluble polymer or a water-insoluble particulate, wherein the coating weight is about 0.01 wt % to 90 wt % of the mass of the coated particulate. The particulates provide long-term scale inhibition downhole in subterranean reservoirs where temperatures exceed 70° C.

17 Claims, 9 Drawing Sheets

(56) References Cited

U.S. PATENT DOCUMENTS

| | | | |
|---|---|---|---|
| 4,393,938 A | 7/1983 | Lawson et al. | |
| 4,406,811 A | 9/1983 | Christensen et al. | |
| 4,431,547 A | 2/1984 | Dubin | |
| 4,575,425 A | 3/1986 | Boffardi et al. | |
| 4,602,683 A | 7/1986 | Meyers | |
| 4,604,211 A | 8/1986 | Kneller et al. | |
| 4,642,194 A | 2/1987 | Johnson | |
| 4,676,911 A | 6/1987 | Fong | |
| 4,762,626 A | 8/1988 | Emmons et al. | |
| 4,801,388 A | 1/1989 | Fong et al. | |
| 4,809,778 A | 3/1989 | Johnson | |
| 4,817,722 A | 4/1989 | Montfort, Jr. et al. | |
| 4,860,829 A | 8/1989 | Carlberg et al. | |
| 5,018,577 A | 5/1991 | Pardue et al. | |
| 5,085,794 A | 2/1992 | Kneller et al. | |
| 5,112,496 A | 5/1992 | Dhawan et al. | |
| 5,141,655 A | 8/1992 | Hen | |
| 5,143,622 A | 9/1992 | Fong et al. | |
| 5,167,828 A | 12/1992 | Emmons et al. | |
| 5,171,459 A | 12/1992 | Kaplan | |
| 5,302,293 A | 4/1994 | Kaplan et al. | |
| 5,346,010 A | 9/1994 | Adams et al. | |
| 5,399,270 A | 3/1995 | Hen | |
| 5,403,493 A | 4/1995 | Mouche et al. | |
| 5,614,006 A | 3/1997 | Algar | |
| 5,741,433 A * | 4/1998 | Mitchell | C09K 5/00 |
| | | | 252/71 |
| 5,750,070 A | 5/1998 | Tang et al. | |
| 5,776,875 A | 7/1998 | Tang et al. | |
| 5,840,638 A | 11/1998 | Cao et al. | |
| 5,840,658 A | 11/1998 | Rosario et al. | |
| 5,893,416 A | 4/1999 | Read | |
| 5,976,414 A | 11/1999 | Bedford et al. | |
| 6,077,440 A | 6/2000 | Roe et al. | |
| 6,209,646 B1 | 4/2001 | Reddy et al. | |
| 6,232,419 B1 | 5/2001 | Duggirala et al. | |
| 6,242,390 B1 | 6/2001 | Mitchell et al. | |
| 6,267,897 B1 | 7/2001 | Robertson et al. | |
| 6,572,789 B1 | 6/2003 | Yang et al. | |
| 6,808,557 B2 | 2/2004 | Holbrey et al. | |
| 6,787,506 B2 | 9/2004 | Blair et al. | |
| 7,195,070 B2 | 3/2007 | Delaloye et al. | |
| 7,419,937 B2 | 9/2008 | Rimmer et al. | |
| 7,451,823 B2 | 11/2008 | Wilson | |
| 7,491,682 B2 | 2/2009 | Gupta et al. | |
| 7,493,955 B2 | 2/2009 | Gupta et al. | |
| 7,503,389 B2 | 3/2009 | Delaloye et al. | |
| 7,704,903 B2 | 4/2010 | Seneschal et al. | |
| 7,896,068 B2 | 3/2011 | Lee et al. | |
| 7,897,546 B2 | 3/2011 | Showalter et al. | |
| 7,902,127 B2 | 3/2011 | Kurian et al. | |
| 7,915,204 B2 | 3/2011 | De Campo et al. | |
| 8,162,054 B2 | 4/2012 | Schultz et al. | |
| 8,334,240 B2 | 12/2012 | Acosta | |
| 8,381,811 B2 | 2/2013 | Keatch et al. | |
| 8,551,925 B2 | 10/2013 | Nguyen et al. | |
| 8,822,390 B2 | 9/2014 | Heath et al. | |
| 8,980,101 B2 | 3/2015 | Musale | |
| 9,090,495 B2 | 7/2015 | Haag et al. | |
| 9,120,965 B2 | 9/2015 | Kurian et al. | |
| 9,193,610 B2 | 11/2015 | Smith et al. | |
| 9,221,700 B2 | 12/2015 | Greene et al. | |
| 9,228,123 B2 | 1/2016 | Song et al. | |
| 2003/0150613 A1 | 8/2003 | Freiter | |
| 2004/0043906 A1 | 3/2004 | Heath et al. | |
| 2004/0084186 A1 | 5/2004 | Allison et al. | |
| 2005/0027048 A1* | 2/2005 | Nakagawa | C03C 3/19 |
| | | | 524/115 |
| 2006/0124301 A1* | 6/2006 | Gupta | C09K 8/516 |
| | | | 166/279 |
| 2011/0012703 A1 | 1/2011 | Menard et al. | |
| 2011/0127039 A1* | 6/2011 | Garcia-Lopez De Victoria | C09K 8/528 |
| | | | 166/308.1 |
| 2011/0162841 A1 | 7/2011 | Wilson | |
| 2012/0012326 A1 | 1/2012 | Darby et al. | |
| 2012/0080641 A1 | 4/2012 | Relenyi | |
| 2013/0255951 A1 | 10/2013 | Little et al. | |
| 2014/0042075 A1 | 2/2014 | Ding et al. | |
| 2014/0305650 A1 | 10/2014 | Song et al. | |
| 2015/0148266 A1 | 5/2015 | Webber et al. | |
| 2016/0160111 A1 | 6/2016 | Smith et al. | |
| 2016/0194225 A1* | 7/2016 | Lask | B01D 69/04 |
| | | | 204/538 |
| 2017/0158945 A1 | 6/2017 | Dreyer et al. | |
| 2018/0265765 A1* | 9/2018 | Vo | C09K 8/52 |

FOREIGN PATENT DOCUMENTS

| | | |
|---|---|---|
| EP | 0108685 A2 | 5/1984 |
| EP | 0 365 237 A2 | 4/1990 |
| EP | 0 632 692 B1 | 6/1996 |
| GB | 1 078 765 A | 8/1967 |
| RU | 2149219 C1 | 5/2000 |
| WO | 2012177568 A1 | 12/2012 |
| WO | 2014186174 A1 | 11/2014 |
| WO | 2015/087345 A1 | 6/2015 |
| WO | 2017/096127 A1 | 6/2017 |

OTHER PUBLICATIONS

Bhardwaj et al.,"Polyacrylamide and poly(acrylamide-co-2-acrylamido-2-methyl-1-propanesulfonic acid)-silica composite nanogels through in situ microemulsion polymerisation," J. Mat. Sci. (2010) vol. 45: pp. 1008-1016.

International Search Report for International Application No. PCT/US2017/032372, dated Jul. 13, 2017, 6 pages.

Written Opinion for International Application No. PCT/US2017/032372, dated Jul. 13, 2017, 12 pages.

Powell et al., "SPE 28999 Controlled-Release Scale Inhibitor for Use in Fracturing Treatments", 1995, 9 pages.

Powell et al., "SPE 30700: Encapsulated Scale Inhibitor for Use in Fracturing Treatments", 1995, 7 pages.

International Search Report for International Application No. PCT/US2016/064559, dated Mar. 20, 2017, 5 pages.

Written Opinion for International Application No. PCT/US2016/064559, dated Mar. 20, 2017, 6 pages.

Brauer, "Phosphate Glasses," Bio-Glasses: An Introduction, First Edition; 2012, John Wiley & Sons, Ltd., pp. 45-64.

Brow, Nature of Alumina in Phosphate Glass: I, Properties of Sodium Aluminophosphate Glass, J. Am. Ceram. Soc., 76 (4), 1993, pp. 913-918.

Brow, Nature of Alumina in Phosphate Glass: II, Structure of Sodium Aluminophosphate Glass, J. Am. Ceram. Soc., 76 (4), 1993, pp. 919-928.

Gomez et al., "Characterization of Polyphosphate Glasses Preparation Using CRTA," Journal of Thermal Analysis, vol. 49, 1997, pp. 1171-1178.

Schneider et al., "Local Structure of Sodium Aluminum Metaphosphate Glasses," J. Am. Ceram. Soc., 86 (2), 2003, pp. 317-324.

Shan et al., "Dissolution Products of a Phosphate Glass Scale Inhibitor and its Scale Inhibition Mechanism," Glass Technol., 42 (4/5), 2001, pp. 122-125.

Sloat, Ben, Controlled Solubility Phosphates—A Versatile Solution to Oilfield Scale Problems, Journal of Petroleum Technology, Nov. 1960, pp. 30-36.

* cited by examiner

SLOW-RELEASE SCALE INHIBITING COMPOSITIONS

FIELD OF THE INVENTION

The present invention generally relates to scale inhibiting compositions and methods for use in high temperature oil recovery applications.

BACKGROUND

Hydraulic fracturing is a well-stimulation technique in which subterranean rock is fractured by a hydraulically pressurized fracturing fluid typically made by combining water, an hydraulic fracturing proppant (conventionally sand or aluminum oxide), and additive chemicals that modify subterranean flow, subterranean interfacial tension, and/or provide other effects. A hydraulic fracture is formed by pumping the fracturing fluid into a wellbore at a rate sufficient to increase pressure at the target depth to exceed that of the fracture gradient (pressure gradient) of the rock. When the hydraulic pressure is removed from the well, the hydraulic fracturing proppants lodge within the cracks to hold the fractures open and bear the stress of the formation pressure. Hydrocarbon compounds such as natural gas and petroleum are recovered via the cracks in the hydrocarbon-containing deep-rock formations. Hydraulic fracturing techniques can be used to form a new well and can also be used to extend the life of an existing conventional oil well.

Within some subterranean reservoirs, the injected water-borne chemicals are exposed to challenging conditions of high temperature and/or high total dissolved solids water sources. For example, in some reservoirs temperatures of 70° C. and above are encountered; temperatures can be as high as 250° C. Additionally, native underground water, or connate, is often characterized as having high total dissolved solids, such as about 0.5 wt % total dissolved solids and as much as about 35 wt % total dissolved solids. In some cases, a substantial portion of the dissolved solids are ionic (one or more salts). Further, since it is a goal of operators of hydraulic fracturing processes to reuse water issuing from the ground during and after the hydraulic fracturing, the injectates themselves are sometimes formed from the mixture of connate and injectate that issues from the ground once the fracturing is accomplished. In such cases, an injectate itself may have high total dissolved solids, be formed and/or injected at temperatures of 70° C. or greater, or both.

Thus, both injectates and connates can contain a variety of alkaline earth metal cations, such as calcium, barium and strontium as well as a variety of anions such as bicarbonate, carbonate, sulfate, phosphate and silicate. When such ions are present in sufficient concentrations, they can combine to form precipitates. Such precipitation can be particularly problematic when the injectate and connate have incompatible ions that individually may not lead to precipitate, but when combined will form precipitate. Scale, formed by the deposition of any of several types of such precipitates, can coat surfaces in contact with the water or aqueous mixtures. Thus a common problem encountered in hydraulic fracturing is the formation of scale on the inside surfaces of conduits of wellheads and various production tubulars and of deposit on reservoir wellbores, including distant cracks and fractures in the rock of the deposit or reservoir. Common scales include Calcite, Barite, Celestite, Anhydrite, Gypsum, Iron sulfide, Halite and various "exotic" scales, such as calcium fluorite, zinc sulfide, and lead sulfide.

Scale build-up decreases permeability of the formation, reduces well productivity and shortens the lifetime of production equipment. In order to clean scales from wells and equipment it can be necessary to stop production which is both time-consuming and costly. In order to address this problem, operators add scale inhibiting chemicals (scale inhibitors) to injectates to prevent scaling in the formation and/or in the production lines downhole and/or at the surface of production wells.

Current scale inhibitors and methods of using such scale inhibitors have the disadvantage of the difficulty in releasing the inhibitor into the well over a sustained period of time. This problem is exacerbated in high temperature environments, where dissolution of applied scale inhibitors may be accelerated. As a result, treatments must repeatedly, or even continuously, be undertaken to ensure that the requisite level of inhibitor is continuously present in the well. Such treatments result in lost production revenue due to down time, or high cost, if continuous injection is chosen as the treatment method. Extensive efforts have been invested into finding chemical additives and methods limiting the release rate of scale inhibiting chemicals to achieve the optimal economic recovery of oil or gas. Such efforts continue, indicating a clear need for scale inhibitors and methods of using such inhibitors that exhibit slower, sustained release in high temperature aqueous environments present in hydraulically fractured oil and gas wells.

U.S. Pat. No. 3,432,428 discloses solid, vitreous polyphosphate glasses for slow dissolution of polyphosphate. Polyphosphate is delivered at a dissolution rate that depends on the temperature of the water. Modified forms of the polyphosphate glass as well as derivatives thereof have been developed which display a decreased rate of dissolution relative to the parent product. For example, U.S. application Ser. No. 14/959,827 discloses modified polyphosphate glasses that further include a calcium compound such as calcium hydroxide, calcium oxide, calcium carbonate, or mixtures thereof; a magnesium compound such as magnesium hydroxide, magnesium oxide, magnesium carbonate, or mixtures thereof; and one or more controlled release additives that are alumina-containing minerals and their polymorphs, aluminate salts and their polymorphs, organic aluminums and combinations thereof. These modified polyphosphate glasses exhibit slowed release of polyphosphate. However, the decrease in dissolution rate is insufficient to address long-term scale inhibition where downhole temperatures are 70° C. or greater.

In addressing the need for decreased dissolution rates of various additive chemicals employed in hydraulic fracturing injectates (called "actives" as a term of art), various approaches have been taken. For example, U.S. Pat. No. 6,808,557 discloses cellulose encapsulation of actives. International Publication No. WO/2014/186,174 discloses the similar use of polysaccharides for encapsulation of actives. U.S. Pat. No. 7,896,068 discloses inductively activated layers applied to encapsulate an active, such that when the layer is inductively heated it releases the encapsulated active. However, these approaches suffer from the shortcoming that the coating materials are quite water soluble themselves, so do not decrease effective dissolution of the polyphosphate either do not sufficiently decrease rate of dissolution of vitreous polyphosphate glasses, or—as in the case of inductively heated release—are very costly and complicated to make and implement.

Thus, there remains a need in the industry for scale inhibitor compositions having decreased dissolution rates, for use in subterranean reservoirs where temperatures of 70°

C. and greater are encountered. There remains a need in the industry to provide such compositions in the form of a mechanically robust, pelletized solid that can be included with proppant packages commonly used in hydraulic fracturing operations. There remains a need in the industry to provide such compositions that deliver acceptable scale inhibition performance in the presence of high total dissolved water sources. There remains a need in the industry to provide such compositions that deliver acceptable scale inhibition performance for at least about 30 days after applying the composition downhole within a hydraulically fractured subterranean reservoir wherein temperatures of 70° C. or greater are present.

SUMMARY OF THE INVENTION

Disclosed herein are coated vitreous polyphosphate glass particulate compositions having reduced dissolution rates in water when compared to the uncoated "parent" particulate. Also disclosed herein are methods of preparing the compositions. Also disclosed herein are methods of using the compositions in oil and gas well hydraulic fracturing operations wherein underground temperatures are between about 70° C. and 250° C. Also disclosed herein is the use of the compositions in oil and gas well hydraulic fracturing operations wherein the water source contacting the particulate includes high total dissolved solids.

The reduced polyphosphate dissolution rate is achieved by applying a coating to the at least a portion of the surface of the polyphosphate particles. The coated particles are sized such that they may be placed into hydraulically generated fractures along with conventional proppants, where they provide prolonged protection against a range of common oilfield scales (e.g., calcite, barite, etc.) at temperatures above 70° C. as the polyphosphates slowly dissolve in the injectate and/or connate at such temperatures. Additionally, the rate of polyphosphate dissolution from the coated particulate is not adversely affected by the presence of high total dissolved solids.

Other objects and features will be in part apparent and in part pointed out hereinafter.

DETAILED DESCRIPTION

Figure 1:
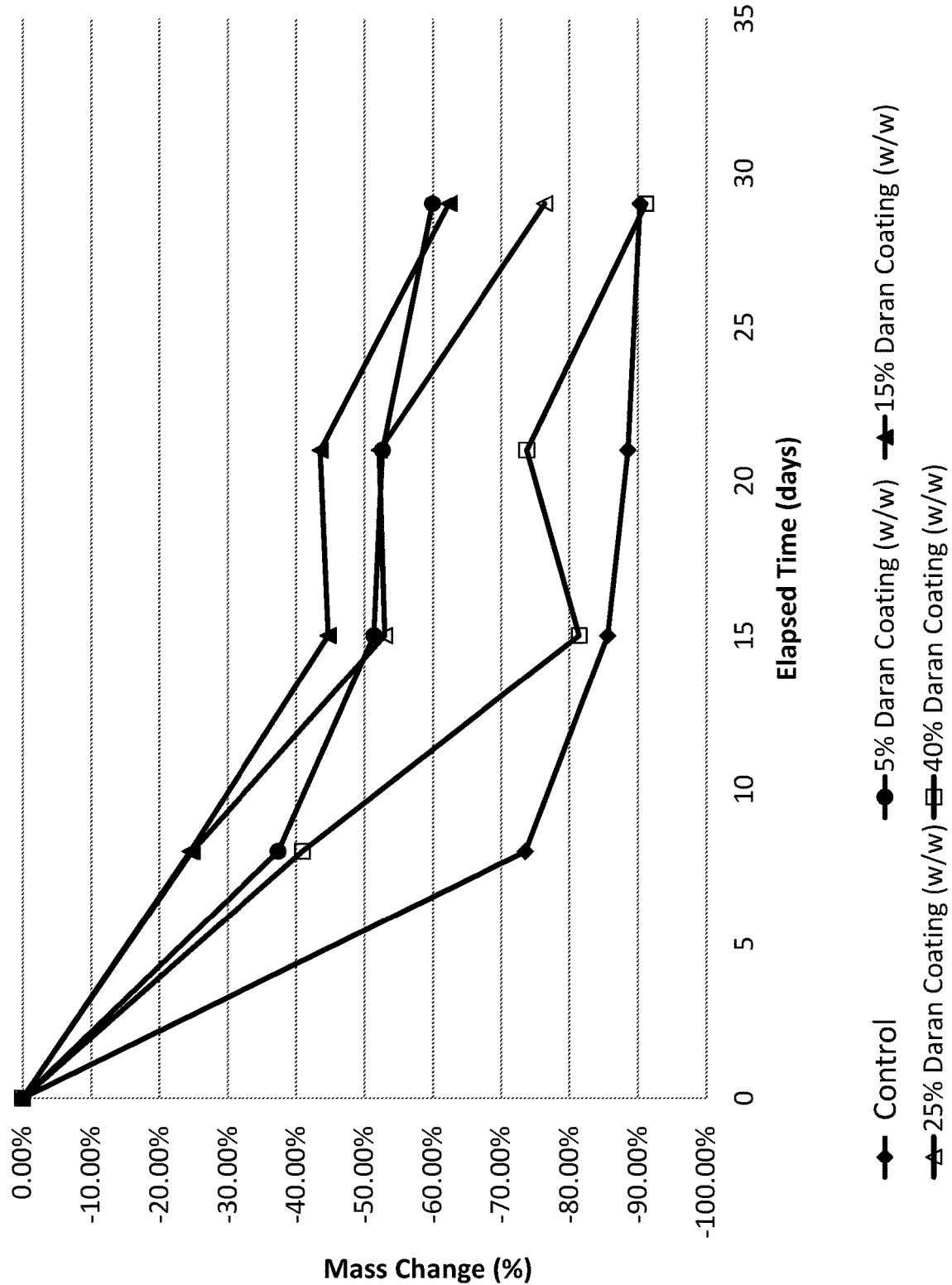
FIG. 1 is a plot showing dissolution rate of a control polyphosphate particulate and the same particulate coated with a coating according to the invention.

Although the present disclosure provides references to preferred embodiments, persons skilled in the art will recognize that changes may be made in form and detail without departing from the spirit and scope of the invention. Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

Definitions

Unless otherwise defined, all technical and scientific terms used herein have the same meaning as commonly understood by one of ordinary skill in the art. In case of conflict, the present document, including definitions, will control. Preferred methods and materials are described below, although methods and materials similar or equivalent to those described herein can be used in practice or testing of the present invention. All publications, patent applications, patents and other references mentioned herein are incorporated by reference in their entirety. The materials, methods, and examples disclosed herein are illustrative only and not intended to be limiting.

As used herein, the term "water soluble" used to describe a polymer or a particulate means more than 1 wt % of the polymer or particulate can be dissolved or dispersed in deionized water at 25° C.

As used herein, the term "water insoluble" used to describe a polymer or a particulate means 1 wt % or less of the polymer can be dissolved or dispersed in deionized water at 25° C.

As used herein, the term "emulsion" or "latex" means a liquid composition comprising a discontinuous phase comprising polymer particles, the discontinuous phase being substantially suspended in water and/or a water source. In some embodiments, an emulsion is a microemulsion. Microemulsions are characterized as emulsions that are substantially transparent and thermodynamically stable. An emulsion may include one or more dissolved salts, buffers, acids, bases, surfactants, or other dissolved, dispersed, or emulsified compounds, materials, components, or combinations thereof.

As used herein, the term "water source" means an injectate, a connate, or a combination thereof. An injectate includes at least water and is injected into the ground in connection with one or more stimulation, completion, or treatment processes. Connate means native water present under the ground that is contacted during one or more stimulation, completion, or treatment processes; when such water flows out of the ground it is often referred to as "produced water". In various embodiments, a water source includes produced water, connate, injectate, wastewater such as runoff water, "gray" water, treated or partially treated waste water, brackish water, sea water, or a combination of two or more such water sources as determined by context. In some embodiments, a water source includes one or more salts, ions, buffers, acids, bases, surfactants, or other dissolved, dispersed, or emulsified compounds, materials, components, or combinations thereof.

As used herein, the term "high temperature" means about 70° C. to 250° C. A high temperature water source is about 70° C. to 250° C. and present within a hydraulically fractured subterranean reservoir.

As used herein, the term "high total dissolved solids" or "high TDS" means a water source having a total dissolved solids ("TDS") content of about 4000 ppm to 350,000 ppm, or one or more of a dissolved calcium content of about 300 ppm to 15,000 ppm, a dissolved magnesium content of about 1000 ppm to 30,000 ppm, a dissolved potassium content of about 300 ppm to 15,000 ppm, a dissolved sodium content of about 5,000 ppm to about 100,000 ppm, a dissolved silica content of about 10 ppm to about 1000 ppm, carbonate alkalinity content of about 150 ppm to about 3000 ppm, a dissolved iron content of about 0.01 ppm to about 10 ppm, a dissolved manganese content of about 0.01 ppm to 10 ppm, a dissolved barium content of about 5 ppm to 50,000 ppm, or a dissolved sulfate content of about 10 to about 20,000 ppm. As used herein "TDS" refers to the total amount of dissolved minerals, salts, metals, anions, and cations in a selected volume of water. In some such embodiments, the dissolved solids are substantially non-polymeric solids. In some such embodiments, the dissolved solids comprise or consist essentially of ionic compounds.

As used herein, the term "molecular weight" refers to the weight average molecular weight ($M_W$). Unless otherwise specified, molecular weight is determined by any analytical technique known by those of skill to be useful for determining weight-average molecular weight, such as size exclusion chromatography.

As used herein, the term "particle size" refers to the opening size of a wire mesh sieve, wherein particles able to pass through the openings are assigned the sieve size, or "mesh", as the particle size. Thus, "particle size" as used herein refers not to an average size but to the maximum size of particles in a mixture thereof, as determined by ability to pass through a known size mesh opening. The American Society for Testing and Materials (ASTM) has developed complete procedures for sieving of particles; see e.g. ASTM C136.

The terms "comprise(s)," "include(s)," "having," "has," "can," "contain(s)," and variants thereof, as used herein, are intended to be open-ended transitional phrases, terms, or words that do not necessarily but may preclude the possibility of additional acts or structures. The singular forms "a," "and," and "the" include plural references unless the context clearly dictates otherwise. The present disclosure also contemplates other embodiments "comprising," "consisting of," and "consisting essentially of," the embodiments or elements presented herein, whether explicitly set forth or not. Generally and as determined by context, the term "includes," as used in the specification, may be interpreted to mean any of "comprising," "consisting of," or "consisting essentially of."

As used herein, the term "optional" or "optionally" means that the subsequently described event or circumstance may but need not occur, and that the description includes instances where the event or circumstance occurs and instances in which it does not.

As used herein, the term "about" modifying, for example, the quantity of an ingredient in a composition, concentration, volume, process temperature, process time, yield, flow rate, pressure, and like values, and ranges thereof, employed in describing the embodiments of the disclosure, refers to variation in the numerical quantity that can occur, for example, through typical measuring and handling procedures used for making compounds, compositions, concentrates or use formulations; through inadvertent error in these procedures; through differences in the manufacture, source, or purity of starting materials or ingredients used to carry out the methods, and like proximate considerations. The term "about" also encompasses amounts that differ due to aging of a formulation with a particular initial concentration or mixture, and amounts that differ due to mixing or processing a formulation with a particular initial concentration or mixture. Where modified by the term "about" the claims appended hereto include equivalents to these quantities. Further, where "about" is employed to describe a range of values, for example "about 1 to 5" the recitation means "1 to 5" and "about 1 to about 5" and "1 to about 5" and "about 1 to 5" unless specifically limited by context.

As used herein, the word "substantially" modifying, for example, the type or quantity of an ingredient in a composition, a property, a measurable quantity, a method, a position, a value, or a range, employed in describing the embodiments of the disclosure, refers to a variation that does not affect the overall recited composition, property, quantity, method, position, value, or range thereof in a manner that negates an intended composition, property, quantity, method, position, value, or range. Examples of intended properties include, solely by way of non-limiting examples thereof, flexibility, partition coefficient, rate, solubility, temperature, and the like; intended values include thickness, yield, weight, concentration, and the like. The effect on methods that are modified by "substantially" include the effects caused by variations in type or amount of materials used in a process, variability in machine settings, the effects of ambient conditions on a process, and the like wherein the manner or degree of the effect does not negate one or more intended properties or results; and like proximate considerations. Where modified by the term "substantially" the claims appended hereto include equivalents to these types and amounts of materials.

Polyphosphate Particulates

The first component of the coated particulate compositions of the invention is a vitreous polyphosphate glass particulate, or polyphosphate particulate. As a general class of materials, all vitreous polyphosphate glasses are useful, when in particulate form, for forming a coated particulate composition of the invention. Blends of these materials are also usefully employed to form the coated particulates of the invention. Useful polyphosphate glasses are composed of $P_2O_5$, alkali metal oxide (e.g. $Na_2O$ or $K_2O$) and metal oxides of magnesium, calcium, strontium, barium, aluminum, or iron. Also useful are vitreous Na—Zn—Mg polyphosphate particulates, disclosed in U.S. Pat. No. 3,432,428, the contents of which is included herein by reference in its entirety and for all purposes. Also useful are modified polyphosphate particulates as described in U.S. application Ser. No. 14/959,827, the contents of which is included herein by reference in its entirety and for all purposes. The modified polyphosphate particulates include a calcium compound such as calcium hydroxide, calcium oxide, calcium carbonate, or mixtures thereof; a magnesium compound such as magnesium hydroxide, magnesium oxide, magnesium carbonate, or mixtures thereof; and one or more controlled release additives that are alumina-containing minerals and their polymorphs, aluminate salts and their polymorphs, organic aluminums, and combinations thereof. Addition of these compounds to the polyphosphate decreases the rate of dissolution of the modified polyphosphate particulate. Employing a blend of polyphosphate particulates in a coated composition further provides control by the operator of one or more hydraulically fractured subterranean reservoirs of dissolution rate of the polyphosphate, as will be discussed in more detail below.

Metal oxide-containing polyphosphate glass particulates are also useful as starting materials to which a coating of water insoluble polymer is applied. In such materials, the metal oxides consist essentially of alkali metal oxide, zinc oxide and at least one member selected from the group consisting of magnesium oxide, calcium oxide, aluminum oxide and silicon dioxide, said oxides being present as components of the polyphosphates in amounts, based on the glass composition, equivalent to 10-20 mol % Zn, 1-20 mol % Mg, 5-20 mol % Ca, 0.5-10 mol % Al, 0.5-10 mol % Si, with the balance of said oxides consisting essentially of said alkali metal oxide. The alkali metal polyphosphate portion of these polyphosphate glasses provides soluble polyphosphate content.

When coated with a water-insoluble polymer as described herein, both the oxide containing polyphosphate particulate and the non-oxide containing polyphosphate particulate are useful and have decreased dissolution rates compared to their uncoated counterparts. In embodiments, for downhole temperatures that do not exceed 70° C., a mixture of coated and uncoated polyphosphate particulates are usefully employed in injectate compositions of the invention, which are described below.

While the particle size of a polyphosphate particulate to be coated is desirably in the range of about 1 to 100 mesh, such as about 5 mesh to 90 mesh, or about 10 mesh to 80 mesh, or about 10 mesh to 70 mesh, or about 10 mesh to 60 mesh, or about 20 mesh to 80 mesh, larger particle size sources or non-particulate polyphosphate glass sources are also usefully employed wherein comminution and/or sizing of the particles is carried out prior to coating. Comminution and sizing are carried out using substantially the same techniques as described below for comminution and sizing of coated particulates.

Methods of Coating

In embodiments, a water insoluble polymer is applied to the surface of the polyphosphate particulate to form a coated particulate composition of the invention. The water insoluble polymer coating functions to provide a physical and/or chemical barrier between the polyphosphate, which is the active scale inhibitor, and the well environment (mixture of oil, gas, and a water source, e.g. connate). The coating slows the dissolution of the polyphosphate particulate such that a useful concentration of polyphosphate species are maintained in the well production zone and well bore for a prolonged period of time at temperatures at or above about 70° C.

In some embodiments, a water insoluble particulate is applied to the surface of the polyphosphate particulate to form a coated particulate composition of the invention. In embodiments, the water insoluble particulate is a water insoluble polymer that is applied to the polyphosphate particulate in particulate form, that is, as substantially discrete particles instead of as e.g. a polymer solution. In some such embodiments, the water insoluble polymer particulate comprises or consists essentially of a crosslinked polymer. In other embodiments, the water insoluble particulate is an inorganic particulate, such as talc.

In some embodiments, one or more water insoluble polymers are combined to coat a polyphosphate particulate and form a coated particulate. In other embodiments, one or more water insoluble particulates are combined to coat a polyphosphate particulate and form a coated particulate. In still other embodiments, one or more water insoluble polymers and one or more water insoluble particulates are combined to coat a polyphosphate particulate. In some embodiments where two or more water insoluble polymers and/or water insoluble particulates are used to coat a polyphosphate particulate, the two or more water insoluble polymers and/or water insoluble particulates are coated contemporaneously, that is, as a blend. In other embodiments where two or more water insoluble polymers and/or water insoluble particulates are used to coat a polyphosphate particulate, the two or more water insoluble polymers and/or water insoluble particulates are coated serially, that is, in a selected order that results in two or more discrete coatings applied to a polyphosphate particulate or blend thereof.

In embodiments, the coated particulates of the invention are obtained by coating a water-insoluble polymer over at least a portion of the polyphosphate particle surface. In embodiments, the water insoluble polymer comprises, consists essentially of, or consists of a polyvinyl chloride, a polyvinylidene chloride, a poly(alkyl acrylate) such as methyl acrylate or ethyl acrylate, a polyethylene terephthalate or isophthalate, a polyethylene, a polypropylene, a polyisoprene, a polybutadiene, a polyacrylonitrile, a poly(acrylonitrile-butadiene-styrene), a styrene-butadiene rubber, a polydiorganosiloxane, a polytetrafluoroethylene, a polycarbonate, polylactic acid, a polyamide, a polyaramide, a polyurethane, a poly(ether-ether ketone), an epoxy polymer, an interpolymer (copolymer, terpolymer, block type or randomly distributed etc.) of two or more of the foregoing, a mixture of two or more of the foregoing, or crosslinked derivatives of any of the foregoing.

In embodiments, the coated particulates of the invention are obtained by coating a water-insoluble particulate over at least a portion of the polyphosphate particle surface. In embodiments, the water insoluble particulate comprises, consists essentially of, or consists of a crosslinked polymer particulate such as those derived from cross-linked derivatives of the polymers and copolymers listed above; or an inorganic water insoluble particulate such as talc, synthetic or natural clays (such as bentonite or montmorillonite), metals, metal oxides, or carbon materials or nanomaterials (such as graphite, graphene, carbon nanotubes, or the like), or functionalized derivatives thereof.

The coating is carried out using any one of a number of known methods employed in the industry to coat particles. As used herein, the term "coating" as applied to methods of coating a polyphosphate particulate means any method or process that results in a water insoluble polymer or a water insoluble particulate sufficiently adhered to the surface of a polyphosphate particulate that it remains associated with the polyphosphate particulate when the coated particulate is added to an injectate and injected into one or more subterranean reservoirs. In a first exemplary but non-limiting approach, a fluidized bed coater such as a Wurster coater is employed to apply a liquid solution, dispersion, or emulsion of a water insoluble polymer or water insoluble particulate onto the surface of one or more polyphosphate particulates, further to dry the coated particulate(s) prior to dispensing a coated particulate composition from the coater. Wurster coaters are obtained, for example, from Freund-Vector Corporation of Marion, Iowa. The Wurster technology is characterized by the location of a spray nozzle to deliver the coating material at the bottom of a fluidized bed of solid particles; however, it should be noted that other fluidized bed configurations are also useful such as spraying at the top, top and bottom, sides, and combinations thereof. In bottom spray devices such as the Wurster device, particles are moved with a fluidizing air stream that is designed to induce a cyclic particle flow upward past the spray nozzle. The nozzle sprays atomized droplets of coating solution, emulsion, or dispersion concurrently with particle flow. Passing particles move upward into an expansion chamber as droplets deposit on their surfaces. The expansion chamber reduces air velocity to allow particles to circulate back to the coating chamber as desired. It also allows particles to further separate from one another temporarily and minimize the potential for particle agglomeration and accretion. The organic solvent or aqueous coating delivery vehicle is evaporated as the particles move into and through the expansion chamber to leave non-volatile coating components on the particle surface as part of the developing film coat. Process parameters are set for optimal particulate removal and film coat characteristics. This batch process is continued until each particle is coated uniformly to the desired coat percentage or film thickness.

Using a fluidized bed coating method, the polyphosphate particulate is coated with a solution, dispersion, or emulsion of the water insoluble polymer or water insoluble particulate, with the resulting coated particulate composition delivered directly from the coater as discrete particles. After coating with e.g. an emulsion, the coated polyphosphate particles include not only the water insoluble polymer or particulate, but also any surfactants or emulsifiers associated with emulsion stability plus any other substantially non-volatile emulsion, solution, or dispersion components present in the coating material along with the water insoluble polymer or water insoluble particulate. In embodiments, the presence and amount of such components do not render the coating water soluble.

Further, by selectively removing coated particulates from the batchwise coater at different times, different coating weights are imparted to aliquots of particulate, thereby easily providing a range thereof for even greater control of dissolution rate in a water source.

In other exemplary but non-limiting embodiments, the Wurster fluid-bed process is used to apply a hot melt coating of the water insoluble polymer onto the particle surfaces. The polymer is heated to a molten state and sprayed to contact the one or more polyphosphate particulates in the same manner as described above. The Wurster type fluidized bed processes offer the advantages of highly uniform coatings, easily adjustable coating weight, and a one-step application and drying chamber (where drying is necessary).

In another exemplary but non-limiting approach, the one or more polyphosphate particulates are melt-blended, for example in an extruder such as a twin screw extruder, kneader, or compounder that is capable of mixing molten polymers with other particulate materials. The product of such mixing is then shaped into pellets, films, sheets, or a monolithic mass of the polymer plus the polyphosphate particulate embedded therein. The solidified product is then comminuted, such as by pelletizing, grinding, and/or ball milling, to provide discrete particles of a suitable size. Comminution may or may not result in discrete particles of polyphosphate surrounded by polymer; in some embodiments comminution results in two or more polyphosphate particles embedded within a continuous polymeric matrix.

In still another exemplary but non-limiting approach, the water insoluble polymer is applied to the surface of the one or more polyphosphate particulates contemporaneously with polymer synthesis. Such an approach is exemplified, for example, by Bhardwaj et al., *J. Mat. Sci.* (2010) 45:1008-1016. The polymer coating is applied to the particulate core via in situ polymerization using a water-in-oil emulsion (w/o latex). The synthesis of the coated particulate thus employs combinations of one or more polyphosphate particulates along with conventional w/o latex polymerization components: a water phase including one or more $\alpha,\beta$-unsaturated water soluble monomers and at least one crosslinker, an oil phase including a non-aqueous solvent or oil, and at least one surfactant suitable to stabilize the water phase as a discontinuous phase within a continuous oil phase. During the synthesis, the one or more polyphosphate particulates are suspended within the discontinuous water phase of the latex along with one or more water soluble monomers and the one or more crosslinkers; upon initiation of polymerization, the monomers and crosslinkers are polymerized in the presence of the particles to form a discrete core-shell morphology wherein the core is the polyphosphate particulate and the shell is the polymer. The crosslinking, contemporaneous with polymerization, renders the polymer water insoluble by physically preventing dissolution. The coated particulate compositions obtained using this method have a narrow size distribution and highly uniform spherical shape attributable to the narrow size distribution and spherical shape of the discontinuous water phase droplets within the latex.

The latex product that results from the contemporaneous polymer synthesis and coating approach is itself suitably employed as an injectate composition (optionally with the further addition of proppant and/or one or more adjuvants) as described below. However, if desired for e.g. storage and/or handling purposes, the latex may be precipitated and dried. We have found that commonly employed drying mechanisms such as spray drying of such latices lead to unagglomerated particles that upon resuspension in water or a water source form discrete, divided particulates having substantially the same size range as measured at the end of the synthesis and prior to drying the composite particles. In an alternative embodiment, the latex product is concentrated by evaporation of a portion of the oil phase, water phase, or both after polymerization is completed to provide a concentrated latex or injectate which is suitably diluted with water or a water source prior to injection.

In still other embodiments, the water insoluble polymer or water insoluble particulate is applied to the polyphosphate particulate by solvent coating (with our without using a fluidized bed for the applying), spin coating, and the like. Coatings applied employing the methods described above as well as other methods that will be understood by those of skill in the art is easily optimized with changes made to the coating formulation, processing conditions, or the use of multiple coating layers and/or the use of two or more different coating processes.

Coated Particulate Compositions and Injectate Compositions

The coated particulate compositions comprise, consist essentially of, or consist of one or more water soluble polyphosphate particulates having about 0.01 wt % to 90 wt % of a water insoluble polymer or water insoluble particulate coating disposed on the surface thereof, based on the weight of the coated particulate composition, for example about 0.1 wt % to 90 wt %, or about 1 wt % to 90 wt %, or about 5 wt % to 90 wt %, or about 10 wt % to 90 wt %, or about 0.01 wt % to 80 wt %, or about 0.01 wt % to 70 wt %, or about 0.01 wt % to 60 wt %, or about 0.01 wt % to 50 wt %, or about 0.01 wt % to 40 wt %, or about 0.01 wt % to 30 wt %, or about 0.01 wt % to 20 wt %, or about 1 wt % to 50 wt %, or about 1 wt % to 40 wt %, or about 1 wt % to 30 wt %, or about 5 wt % to 50 wt %, or about 5 wt % to 40 wt %, or about 5 wt % to 30 wt %, or about 5 wt % to 20 wt %, or about 10 wt % to 50 wt %, or about 10 wt % to 40 wt %, or about 10 wt % to 30 wt %, or about 10 wt % to 20 wt % of the water insoluble polymer or water insoluble particulate disposed on the surface of the polyphosphate particulate, based on the total weight of the coated particulate composition.

In some embodiments, the particle size of the coated particulate is advantageously selected to be similar to, or substantially the same as, the proppant particles to be injected in one or more hydraulic fracturing processes along with the coated particulate compositions, so that the coated particulate becomes lodged within fissures of the rock and within capillaries in similar fashion to the proppant. Subsequent contact of the lodged particulate with a water source leads to the desired rate of dissolution of phosphate species at temperatures at or above 70° C. In embodiments, the particle size of the coated particulate in the injectate compositions of the invention is about 5 to 1000 mesh, or about 5 to 900 mesh, or about 5 to 800 mesh, or about 5 to 700 mesh, or about 5 to 600 mesh, or about 5 to 500 mesh, or about 5 to 400 mesh, or about 5 to 300 mesh, or about 5 to 200 mesh, or about 5 to 100 mesh, or about 5 to 90 mesh, or about 5 to 80 mesh, or about 5 to 70 mesh, or about 10 to 100 mesh, or about 15 to 90 mesh, or about 20 to 90 mesh, or about 25 to 90 mesh, or about 30 to 90 mesh, or about 10 to 80 mesh, or about 20 to 80 mesh, or about 20 to 70 mesh.

The particle size of the coated particulate is selected by any means known to those of skill in the art. In embodiments the selection is accomplished by applying the coated particulate to a sieve or screen having a known mesh size, and collecting the coated particulate that passes through the sieve or screen. In some embodiments, the coated particulate is comminuted prior to selection of particle size. Comminution is accomplished using techniques familiar to those of skill; commonly employed techniques include grinding, ball milling, and the like.

The coated particulate compositions of the invention include compositions having more than one polyphosphate particulate (that is, more than one chemically distinct polyphosphate glass species as described above), more than one polyphosphate particle size, more than one coating weight applied to the polyphosphate particulate, more than one coated particle size, or a combination of two or more of these variations. Such mixtures of chemically distinct species, particle size species, and/or coating weight of coated particulate, delivered in a single combination provides complete flexibility to the operator of one or more subterranean reservoirs to adjust dissolution rate of phosphate species within the reservoir over any range of temperatures include temperatures of 70° C. and above.

In some embodiments, the coated particulate includes a topcoating of a glidant. The topcoating is applied after the polymer coating is applied to the polyphosphate. The topcoating operates to reduce or eliminate blocking of dry particulate during storage and/or impart good flow properties for handling of the dry particulates prior to injection. In some embodiments, the topcoating is applied using the same or a similar method as used to coat the particulate with the polymer. Examples of suitable glidants for topcoating the coated particulates include polysaccharides such as starches (potato starch, corn starch etc.), cellulose, hemicellulose, and derivatives thereof (hydroxypropylcellulose and the like); saccharides such as sucrose, lactose, and the like; salts of $C_1$-$C_{30}$ organic acids such as sodium, lithium, potassium, calcium, zinc, or magnesium salts of acetic acid, benzoic acid, octanoic acid, lauric acid, stearic acid, oleic acid, and mixtures of two or more thereof; boric acid and sodium, lithium, potassium, calcium, zinc, or magnesium salts thereof; waxes derived from petroleum, plant, or animal sources; and particulate or colloidal alumina, silica, zirconia, magnesia, and mixtures thereof derived from natural or synthetic sources and including for example aluminosilicates such as zeolites, magnesium silicates such as talc, and natural and synthetic clays. Where a glidant is included as a topcoating on a coated particulate, the glidant is present in an amount of about 0.01 wt % to 5 wt % based on the weight of the coated particulate.

In embodiments, the coated particulate compositions of the invention are used to form one or more injectate compositions. Injectate compositions of the invention comprise at least water and one or more coated particulate compositions. In some embodiments, the water is a water source. In some embodiments, the components of the injectate compositions are simply combined, usually with mixing. The combining and mixing is accomplished prior to injecting the injectate underground. In some embodiments, the combining and mixing is accomplished continuously and in-line with injecting. In other embodiments the injectate is prepared before the injecting, such as in a batchwise preparation.

The water employed to form the injectate is water or a water source. It is an advantage of the injectate compositions of the invention that use of a water source such as connate or produced water is acceptable to form the injectate compositions; that is, the coated particulates readily disperse within such water sources in a manner sufficient for injection. The pH of the water or water source used to form the injectate compositions of the invention is acidic, neutral or alkaline, i.e., a pH in the range of about 5.0 to about 14.0. The amount of the coated particulate composition in the injectate compositions of the invention is not particularly limited and is determined by the operator of one or more stimulation, completion, or treatment processes. In embodiments, the injectate compositions include about 0.0001 wt % (that is, 1 ppm) to 10 wt % of the uncoated polyphosphate particulate as a weight percent of the injectate, or about 0.001 wt % to 10 wt %, or about 0.01 wt % to 10 wt %, or about 0.1 wt % to 10 wt %, or about 0.5 wt % to 10 wt %, or about 1 wt % to 10 wt %, or about 2 wt % to 10 wt %, or about 3 wt % to 10 wt %, or about 4 wt % to 10 wt %, or about 5 wt % to 10 wt %, or about 0.01 wt % to 8 wt %, or about 0.01 wt % to 7 wt %, or about 0.01 wt % to 6 wt %, or about 0.01 wt % to 5 wt %, or about 0.01 wt % to 4 wt %, or about 0.01 wt % to 3 wt %, or about 0.1 wt % to 8 wt %, or about 0.1 wt % to 5 wt %, or about 0.5 wt % to 5 wt % of the uncoated polyphosphate particulate. In embodiments, the weight percent of the coated particulate composition in the injectate compositions of the invention is suitably adjusted to include the selected weight percent of (uncoated) polyphosphate particulate. That is, the amount of coated particulate composition included in an injectate is selected based on the targeted polyphosphate content of an injectate. Polyphosphate content, in turn, is selected by one of skill in use of conventional vitreous polyphosphate scale inhibitors in injectates, and is generally selected to be within the weight percent ranges disclosed above.

In some embodiments, the injectate compositions further include a proppant. Proppants are particulates such as sand or alumina that are within an hydraulically fractured underground environment, further wherein the particle has a size and shape suitable for lodging within cracks and capillaries of one or more hydraulically fractured subterranean reservoirs. The injectate compositions of the invention are not particularly limited as to the amount of proppant included therein. In embodiments, the particle size of the coated particulate is similar to or substantially the same as the particle size of the proppant particles present in an injectate composition of the invention.

In some embodiments, the injectate compositions further include one or more adjuvants. Adjuvants include any of the chemicals known to those of skill that are advantageously added to injectates employed in hydraulic fracturing processes. Such adjuvants include but are not limited to corrosion inhibitors, biocides, paraffin inhibitors, pH adjusting agents or buffers, surfactants, demulsifiers, water soluble or dispersible polymers, cosolvents, and the like. The one or more adjuvants are included in the injectate compositions at about 0 wt % to 20 wt % based on the weight of the injectate.

Use of the Compositions

In embodiments, the injectate compositions of the invention are injected into the ground in conjunction with one or more hydraulic fracturing processes. During the injecting, the coated particulates are carried into the fractured area, where they are of a suitable size to become lodged within the fractures or other capillary passages within the forming or formed subterranean reservoir. Once lodged, the coated particulates slowly release phosphate species (including various phosphate monomeric and oligomeric species and counterions associated therewith) into the water proximal to the coated particulate. High temperature, high total dissolved solids, and high pressures encountered underground are all encountered by the coated particulates in various reservoirs; in many cases more than two of these conditions are found within a reservoir. It is a feature of the invention that the dissolution rate of phosphate species under high temperature conditions is sufficient to provide the stated level of phosphate in the water proximal to the coated particulate. High pressure and high total dissolved solids, where also present, do not have deleterious effects on the dissolution rate of the active phosphate species.

The phosphate concentration optimally maintained by the subterranean dissolution of the coated particulate depends on the total dissolved solids present in the water source proximal to the and amount of scale-forming ions in the water, the chemical makeup and surface structure of the underground environment, the temperature of the water or water source contacting the coated particulate, pH of the water environment contacting the coated particulate, residence time of the water proximal to the particulate, and like factors. In some embodiments, the release of phosphate species is rapid for a period of time immediately following injection thereof into a subterranean reservoir, leading to a high initial concentration of phosphate that quickly drops off to levels of e.g. 500 ppm or less. In embodiments, about 0.1 ppm to 500 ppm by weight as $PO_4$ or $PO_4$ equivalents is present in a high temperature, aqueous underground environment proximal to the coated particulate, for example about 1 ppm to 500 ppm, or about 5 ppm to 500 ppm, or about 10 ppm to 500 ppm, or about 20 ppm to 500 ppm, or about 30 ppm to 500 ppm, or about 40 ppm to 500 ppm, or about 50 ppm to 500 ppm, or about 60 ppm to 500 ppm, or about 70 ppm to 500 ppm, or about 80 ppm to 500 ppm, or about 90 ppm to 500 ppm, or about 100 ppm to 500 ppm, or about 0.1 ppm to 400 ppm, or about 0.1 ppm to 300 ppm, or about 0.1 ppm to 200 ppm, or about 0.1 ppm to 100 ppm, or about 0.1 ppm to 90 ppm or about 0.1 ppm to 80 ppm, or about 0.1 ppm to 70 ppm, or about 0.1 ppm to 60 ppm, or about 0.1 ppm to 50 ppm, or about 0.1 ppm to 40 ppm, or about 0.1 ppm to 30 ppm, or about 0.1 ppm to 20 ppm, or about 0.1 ppm to 10 ppm, or about 1 ppm to 100 ppm, or about 5 ppm to 100 ppm, or about 10 ppm to 100 ppm, or about 10 ppm to 90 ppm, or about 10 ppm to 80 ppm, or about 10 ppm to 70 ppm, or about 10 ppm to 60 ppm, or about 10 ppm to 50 ppm, or about 10 ppm to 40 ppm or about 10 ppm to 30 ppm, or about 10 to 25 ppm by weight as $PO_4$ or $PO_4$ equivalents proximal to the coated particulate residing within a subterranean reservoir.

In applying the injectate compositions of the invention to one or more subterranean reservoirs, the operator advantageously selects one or more of the coated particulates to include in an injectate composition. In some embodiments the operator employs a blend of two or more of the particulate compositions for coating and subsequent mixing in an injectate composition. In other embodiments, the operator employs a blend of two or more coated particulates for mixing in an injectate composition. In still other embodiments, the operator selects a mixture of coated and uncoated polyphosphate particulates, wherein at least one of the coated polyphosphate particulates is a particulate composition of the invention. As described above, chemically distinct polyphosphate particulates are all usefully employed individually to make the coated compositions of the invention. Usefully, these various polyphosphate particulate starting materials have inherently variable dissolution rates in a given aqueous environment. The variability in dissolution rate provides a method of controlling release by providing a mixture of inherently faster and slower dissolving particulates in a single injectate. While the rate of dissolution of all the polyphosphate particulates is decreased by applying the subject coatings thereto, further control of dissolution rate is advantageously obtained by providing a mixture of polyphosphate particulates in a selected ratio to adjust dissolution rate within a high temperature subterranean reservoir. Thus, for example, by weight of active (that is, polyphosphate) in one or more injectate compositions of the invention For example, in a non-limiting embodiment, a coated vitreous Na—Ca—Mg polyphosphate particulate is advantageously blended with a coated modified polyphosphate particulate in a selected ratio that varies from 1:1000 to 1000:1 Na—Ca—Mg polyphosphate particulate: modified polyphosphate particulate by weight of active in one or more injectate compositions of the invention. The specific ratio of coated particulates in an injectate is selected by the operator of a hydraulic fracturing process is based on conditions within the reservoir; thus, for example, a lower such ratio is employed where relatively higher subterranean temperatures are encountered downhole, and a higher such ratio is employed where relatively lower subterranean temperatures are encountered.

In another non-limiting embodiment, coated particulates having different coating weights are employed in a mixture thereof at a selected ratio in one or more injectates. Such blends provide flexibility for the operator of one or more hydraulic fracturing processes to control the rate of dissolution of phosphate species into the subterranean reservoir in a manner that suitably accounts for underground conditions of temperature and total dissolved solids within the injectate and connate encountered.

In a selected water source, the coated particulates dissolve at least about 10% more slowly than the corresponding uncoated polyphosphate particulates of the same particle size, and up to 50% more slowly than the corresponding uncoated polyphosphate particulates of the same particle size, for example about 10% to 50% more slowly, or about 10% to 40% more slowly, or about 20% to 50% more slowly, or about 20% to 40% more slowly, or about 30% to 50% more slowly in terms of rate of polyphosphate dissolution in a selected water source. This is true even for temperatures as high as 300° F., in connate having high total dissolved solids, or both.

In these and other various embodiments, the coated polyphosphate compositions provide prolonged protection against a range of common oilfield scales, as the polyphosphates slowly dissolve. Common oilfield scales include Calcite, Barite, Celestite, Anhydrite, Gypsum, Iron sulfide, Halite and various "Exotic" scales, such as calcium fluorite, zinc sulfide, and lead sulfide.

The compositions and methods of present invention provide advantages over current techniques at least in that dissolution rate of phosphate species into the water source is reduced, while scale inhibition behavior attributable to the phosphate species is retained. Such methods and compositions improve efficiency and reduce costs with minimal changes to the hydraulic fracturing process.

The coated particulates of the invention, whether or not as part of an injectate composition, are usefully employed as scale inhibiting compositions in one or more industrial processes other than hydraulic fracturing. Scale formation (particularly calcite and barite) is a ubiquitous challenge in any area where water/brines are part of a process. Processes that incorporate water temperature or pressure changes (e.g., heat exchangers, cooling towers, etc.) or mixing of waters that have different salt contents are particularly prone to scale formation. In various further embodiments, the coated particulate compositions and methods of the present invention can be utilized in such applications. Other applications include Industrial Water Systems, transportation pipelines, water softeners and waste water treatment equipment.

Examples of Industrial Water Systems include, but are not limited to cooling towers, paper mills, metal working fluids, metal and/or mineral mining systems, heat exchangers, reinjection water such as produced water from oil production, flooding water used in secondary oil recovery, geothermal systems, fluid coolers, hydrotesting of pipelines, water treatment or purification plants and equipment, including reverse osmosis membranes, ultrafiltration or ion exchange.

EXPERIMENTAL

In each of the examples below, the following procedure was used.

A polyphosphate particulate, ASP529, was obtained from the Nalco Co. of Naperville, Ill. The product was provided in dry form, having no solvents, surfactants or other additives. The particulate was initially sized to 10-30 mesh using the techniques of ASTM E-11 prior to coating.

A Wurster fluidized bed coating device (obtained from Freund-Vector Corporation of Marion, Iowa) was employed to apply a coating of an indicated material to the polyphosphate particulate at the indicated weight, wherein weight percent coating expressed is the weight percent of the coated and dried particulate composition that is attributable to the coating.

Dissolution Method A: For studies conducted at temperatures below 200° F. (93° C.), 3-5 grams of a coated polyphosphate composition was placed in a polyester or nylon filter bag, 100 μm pore size, and the bag was sealed with a rubber band or nylon zip tie. The bagged samples were placed in a 1 L Erlenmeyer flask wrapped with silicone heating tape and glass wool for insulation. The flask was filled with 500 mL of the indicated water source, sealed with a stopper through which a thermocouple was inserted to monitor the solution's temperature, and heated to the target temperature. One to eight bagged samples were tested in a single flask. ASP529 (obtained from Nalco Champion of Sugar Land, Tex.) was included in all flasks to serve as an internal standard. The contents of the flask were not stirred.

At selected times indicated in the applicable dissolution rate plots shown in FIGS. 1-8, the flask was cooled to ambient laboratory temperature, the bagged samples were removed and air dried, and the mass of the particulate retained in the bagged samples was recorded. The flask was then refilled with fresh water or brine, the samples were added, the flask was sealed and heated, and the test was continued.

Dissolution Method B: Method B was employed for studies conducted at temperatures of 200° F. (93° C.) or higher. Method B is the same as Method A except for the following differences. Stainless steel wire mesh was substituted for the polyester or nylon filter bags, and the mesh bags were sealed with copper wire. A 500 mL OFITE stainless steel HTHP aging cell was substituted for the Erlenmeyer flask, heating was achieved by placing the cells in an oven (rather than using heating tape), and the fluid volume was reduced from 500 mL to 300 mL. In some cases, the test cells were initially cooled in a water bath to accelerate the rate of cooling.

Example 1

Batches of particulate were coated to 5 wt %, 15 wt %, 25 wt %, and 40 wt % with DARAN® SL159 (obtained from Owensboro Specialty Polymers, Inc. of Owensboro, Ky.), a vinylidene chloride-methyl acrylate copolymer dispersion in water (CAS No. 25038-72-6). Using Method B, dissolution of the particulate was compared to the polyphosphate particulate starting material ASP529 alone as a control. Dissolution testing was conducted at 250° F. (121° C.) in deionized water. Results of dissolution studies are shown in FIG. 1. Normalizing the results to reflect only weight loss due to polyphosphate dissolution, the Control sample lost about 90 wt % of the initial mass after 28 days at 250° F., whereas in the coated samples 5 wt % to 15 wt % DARAN® lost about 60 wt % to 63 wt % polyphosphate mass. The sample having 25 wt % DARAN® lost about 75 wt % of the polyphosphate mass, and the sample having 40 wt % DARAN® lost about 90 wt % of the polyphosphate mass.

Example 2

Figure 2:
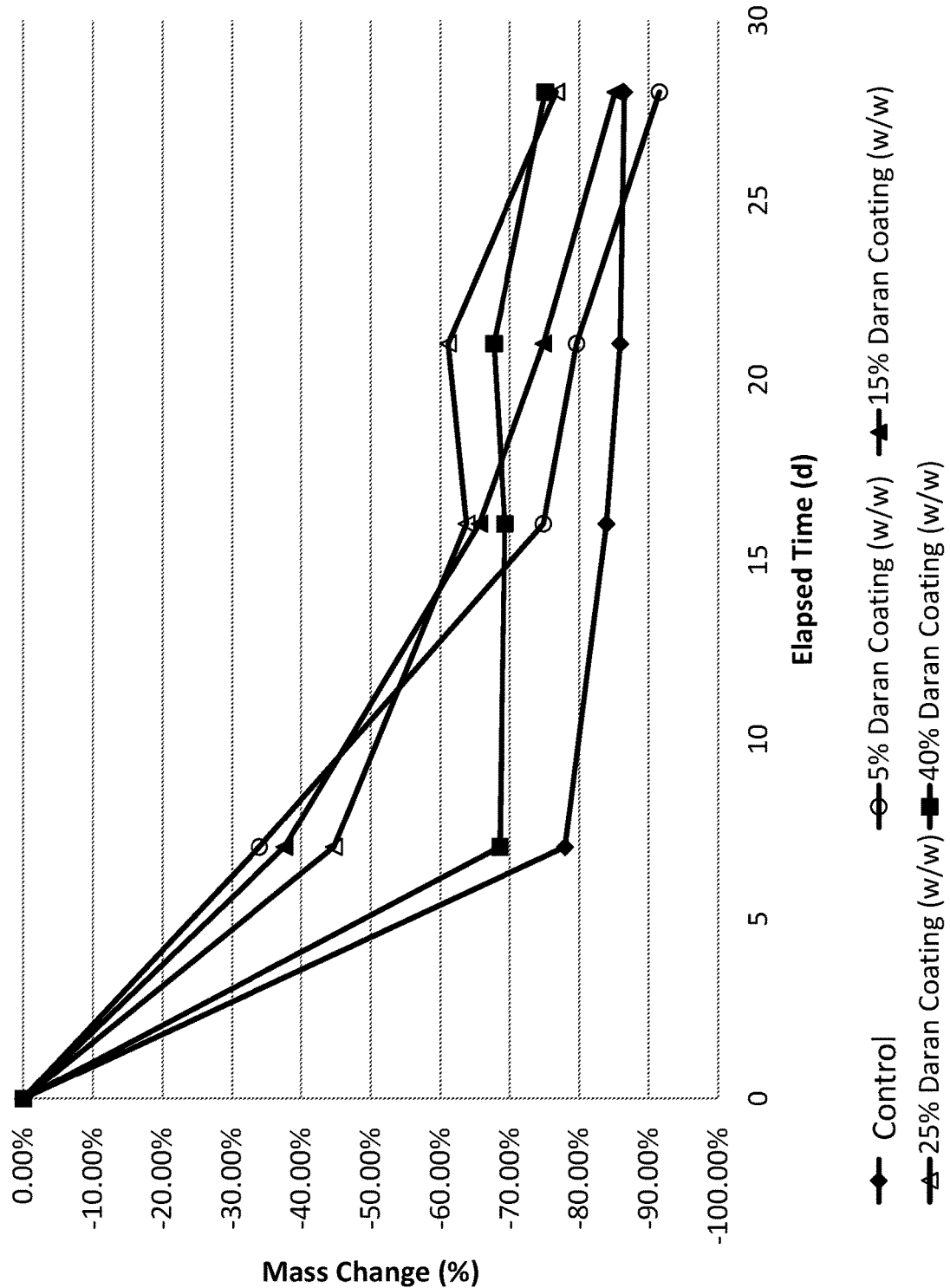
FIG. 2 is another plot showing dissolution rate of a control polyphosphate particulate and the same particulate coated with a coating according to the invention.

The procedure of Example 1 was repeated except that the test was conducted at 300° F. (149° C.). Results are shown in FIG. 2. After 28 days at 300° F., the control particulate lost more than 85 wt % of the initial mass; the 15 wt %, 25 wt %, and 40 wt % coated samples lost about 75 wt % of the initial mass of polyphosphate, when normalized to reflect only polyphosphate loss.

Example 3

Figure 3:
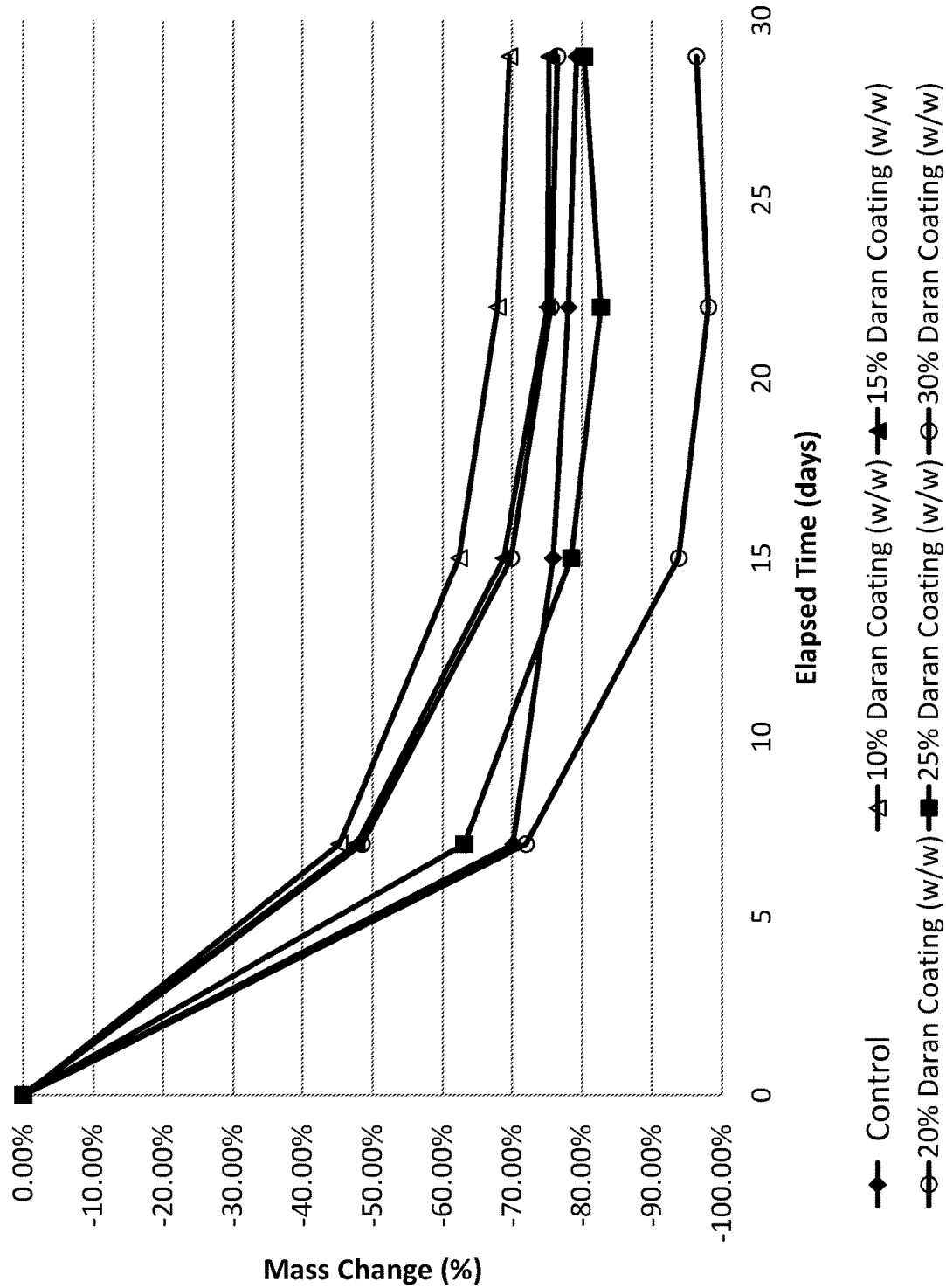
FIG. 3 is another plot showing dissolution rate of a control polyphosphate particulate and the same particulate coated with a coating according to the invention.

The procedure of Example 2 was repeated except that the coating weights were 10 wt %, 15 wt %, 20 wt %, 25 wt %, and 30 wt %. Results of dissolution studies, normalized for polyphosphate loss, are shown in FIG. 3. The Control sample lost about 80 wt % of the initial mass after 28 days at 300° F., whereas the coated sample having 10 wt % DARAN® lost only about 70 wt % polyphosphate after 28 days at 300° F. The coated sample having 30 wt % coating lost over 95 wt % polyphosphate after 28 days at 300° F.

Example 4

Figure 4:
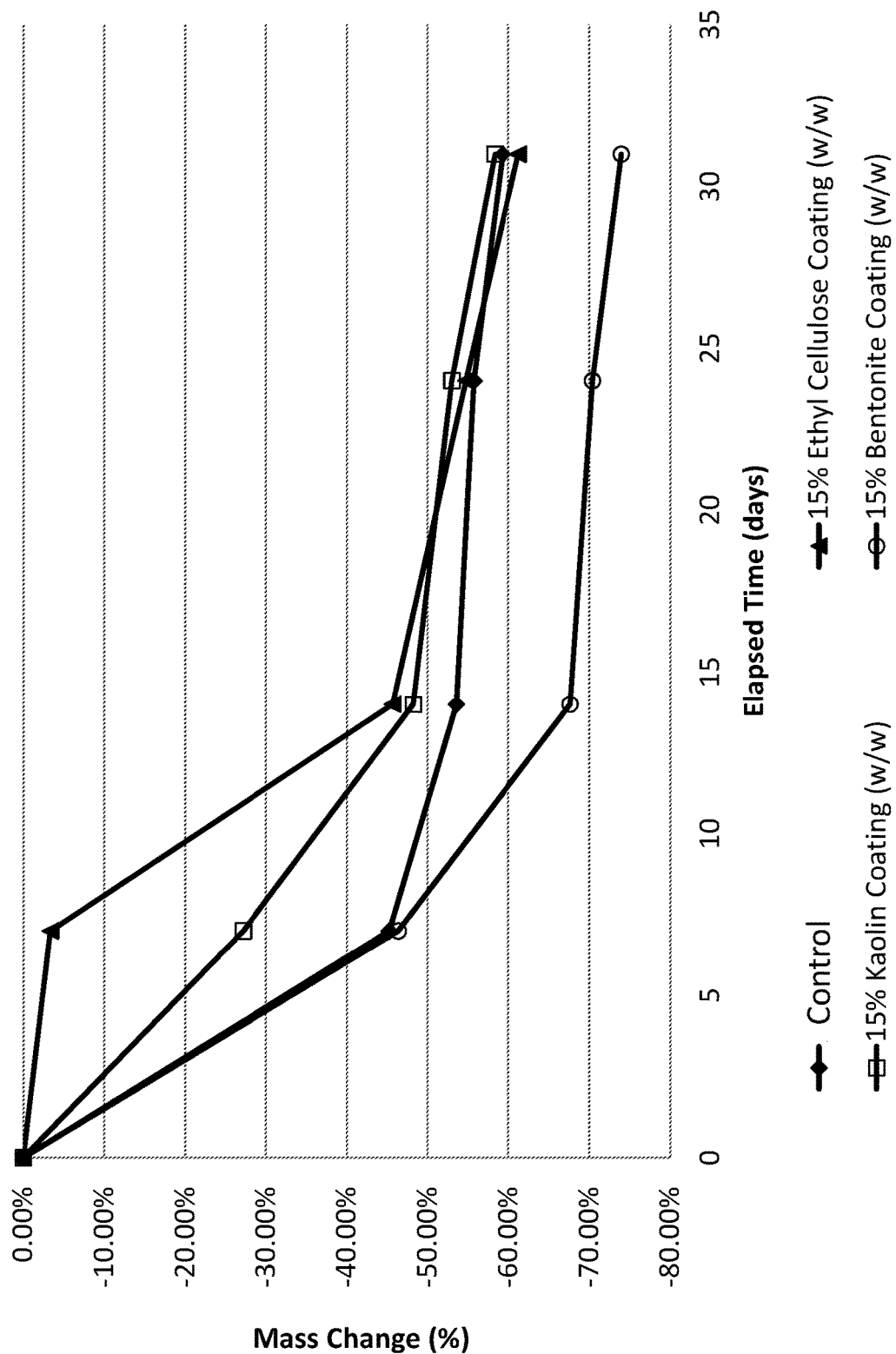
FIG. 4 is another plot showing dissolution rate of a control polyphosphate particulate and the same particulate coated with a coating according to the invention.

The procedure of Example 3 was repeated except that 15 wt % of kaolin, 15 wt % ethyl cellulose, and 15 wt % bentonite particulates were coated onto the polyphosphate particulate (control) using the procedure outlined above. Results of dissolution studies are shown in FIG. 4. The bentonite coated sample lost about 75 wt % of the initial mass after 28 days at 300° F., whereas the Control and other samples lost about 60 wt % of initial mass after 28 days at 300° F. Notably, the ethyl cellulose and kaolin coatings were more effective in reducing the rate of dissolution for an initial time period of about 14 days, evidenced by loss of less than 5 wt % for the ethyl cellulose coated particulate after 7 days and less than 30 wt % loss for the kaolin coated particulate after 7 days.

Example 5

Figure 5:
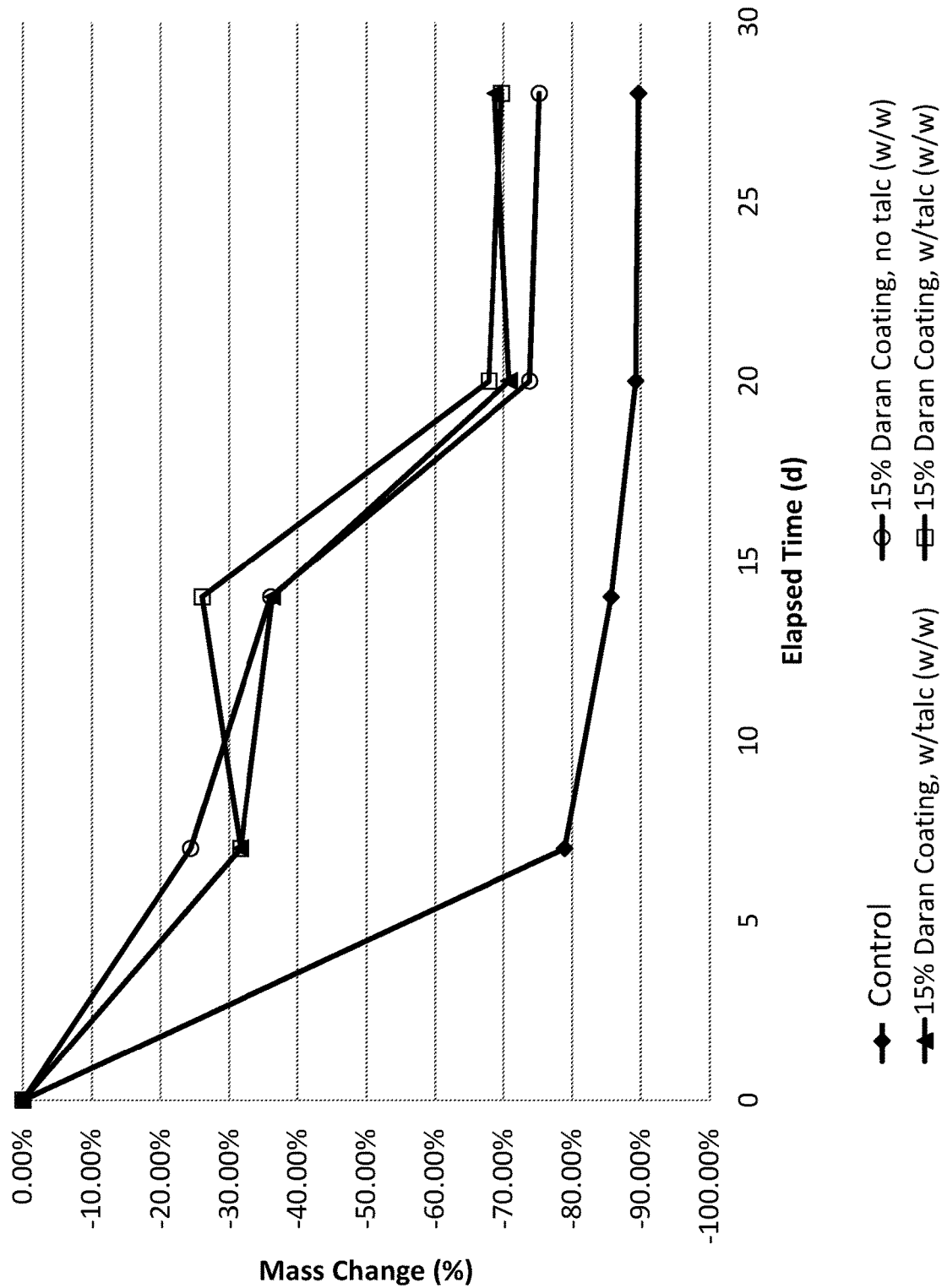
FIG. 5 is another plot showing dissolution rate of a control polyphosphate particulate and the same particulate coated with a coating according to the invention.

The procedure of Example 2 was repeated except that the polyphosphate particulate was initially sized to 40-70 mesh prior to coating, further wherein all samples were coated with 15 wt % DARAN®. In some samples, 0.5 wt % of a talc particulate was added to the final particulate after coating, to prevent blocking and agglomeration. Results are shown in FIG. 5. The Control sample lost greater than 85 wt % of the initial mass of polyphosphate after 28 days at 300° F., whereas the coated samples lost less than 75 wt % of initial mass after 28 days at 300° F. The presence or absence of talc does not affect the rate of dissolution. Normalized for polyphosphate loss, all samples lost more than 85 wt % of the initial mass of polyphosphate.

Example 6

Figure 6A:
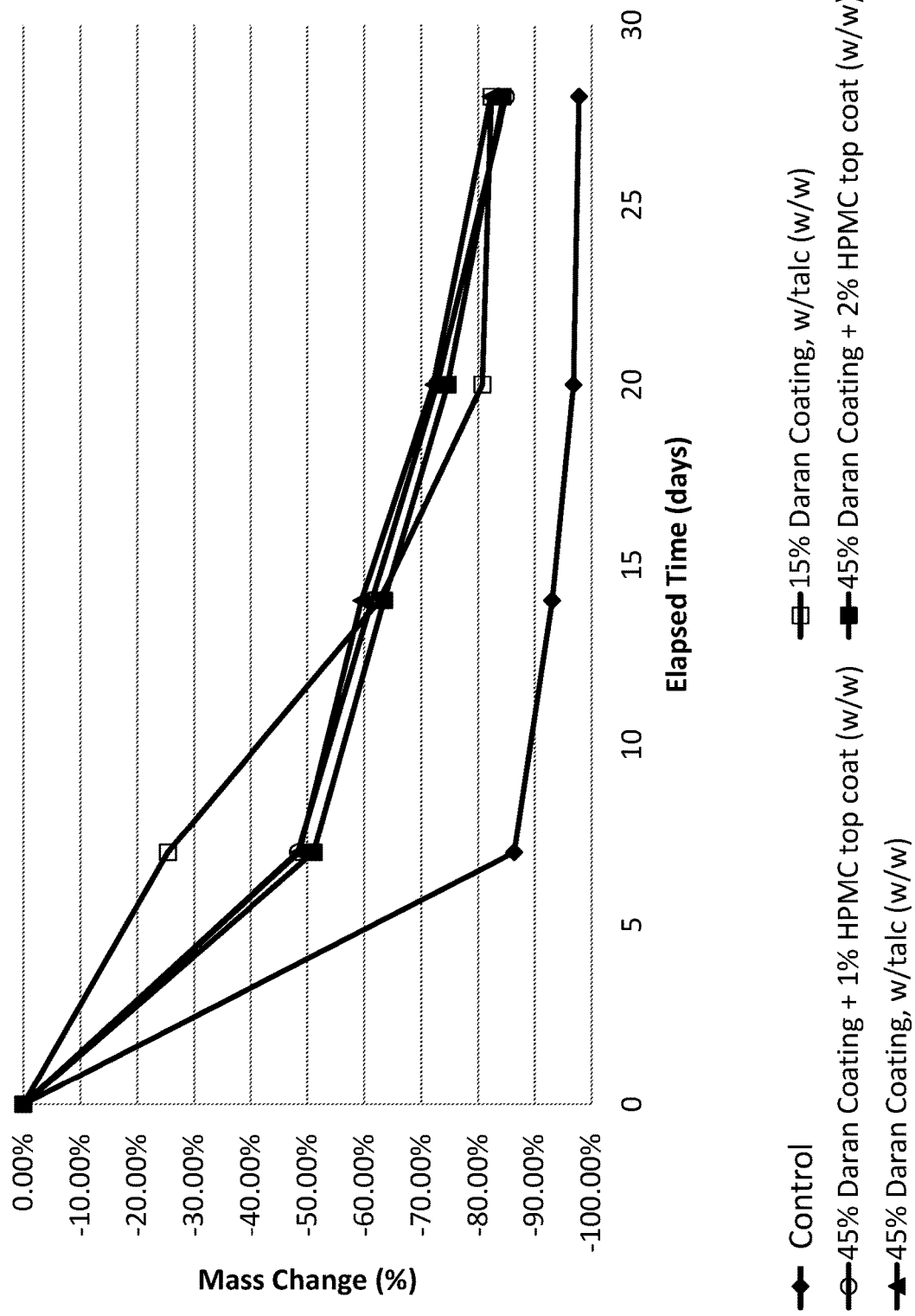
FIGS. 6A and 6B are plots showing dissolution rate of a control polyphosphate particulate and the same particulate coated with a coating according to the invention.
Figure 6B:
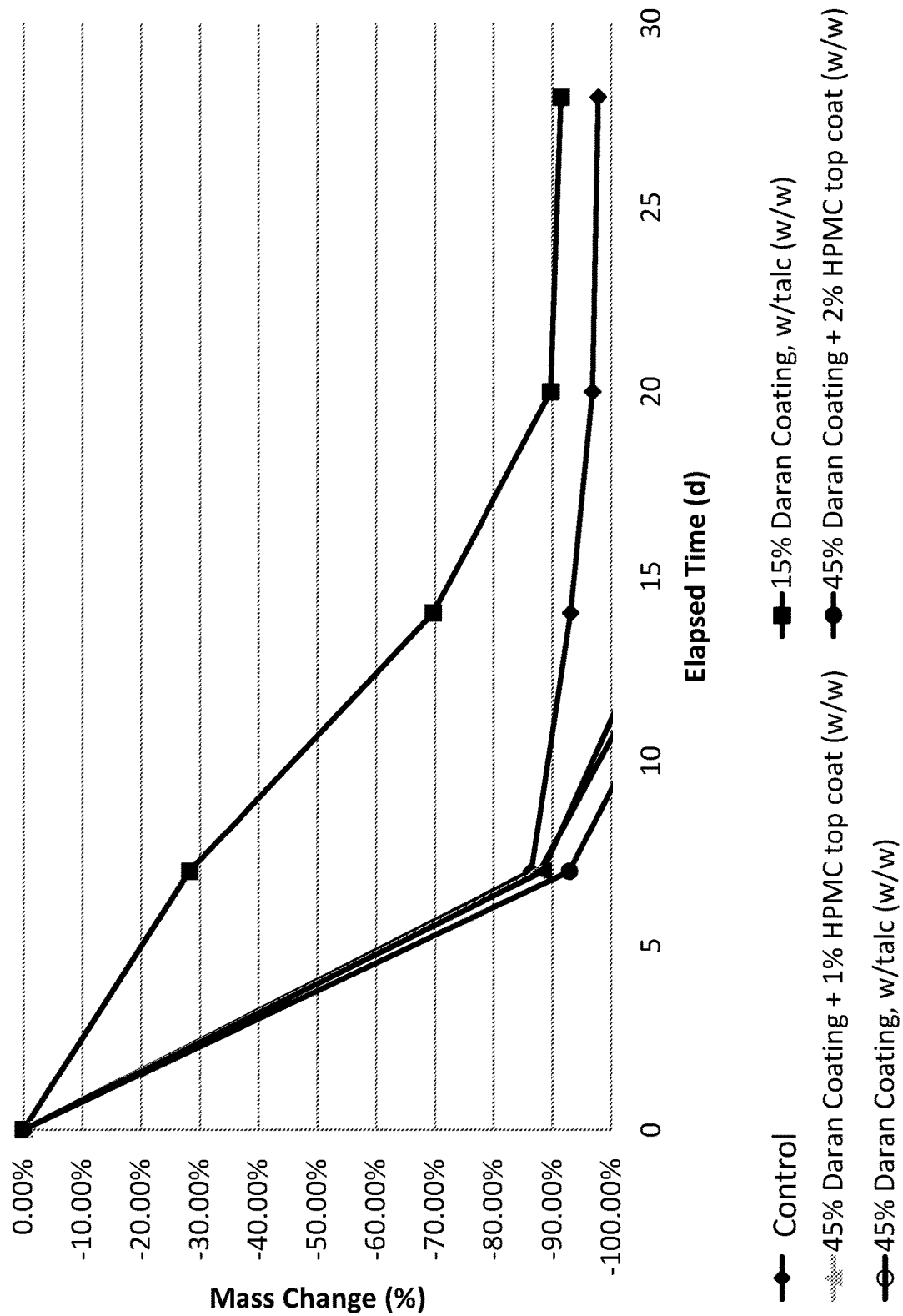

The procedure of Example 5 was repeated, wherein the 40-70 mesh particulate was coated with either 15 wt % or 45 wt % DARAN® and the coated particulate was further subjected to an additional top coating of talc or a 1 wt % or 2 wt % coating of hydroxypropylmethylcellulose (the latter coated from a waterborne dispersion). Results of dissolution studies are shown in FIG. 6A. While the low coating weight (15 wt %) coating appears to slow dissolution more in the short term, e.g. about the first 7 days, at the end of 28 days all the coated samples lost 80-85 wt % of mass, while the uncoated control lost more than 95 wt % mass. When the measurements were normalized to account only for the weight of the polyphosphate in all samples, the coating of 15 wt % DARAN® lost about 90 wt % of polyphosphate and all remaining samples (Control aside) lost more than 100 wt %; that is, the total loss includes both phosphate species and some part of the particulate coating as well. The normalized curve is shown in FIG. 6B.

Example 7

Figure 7:
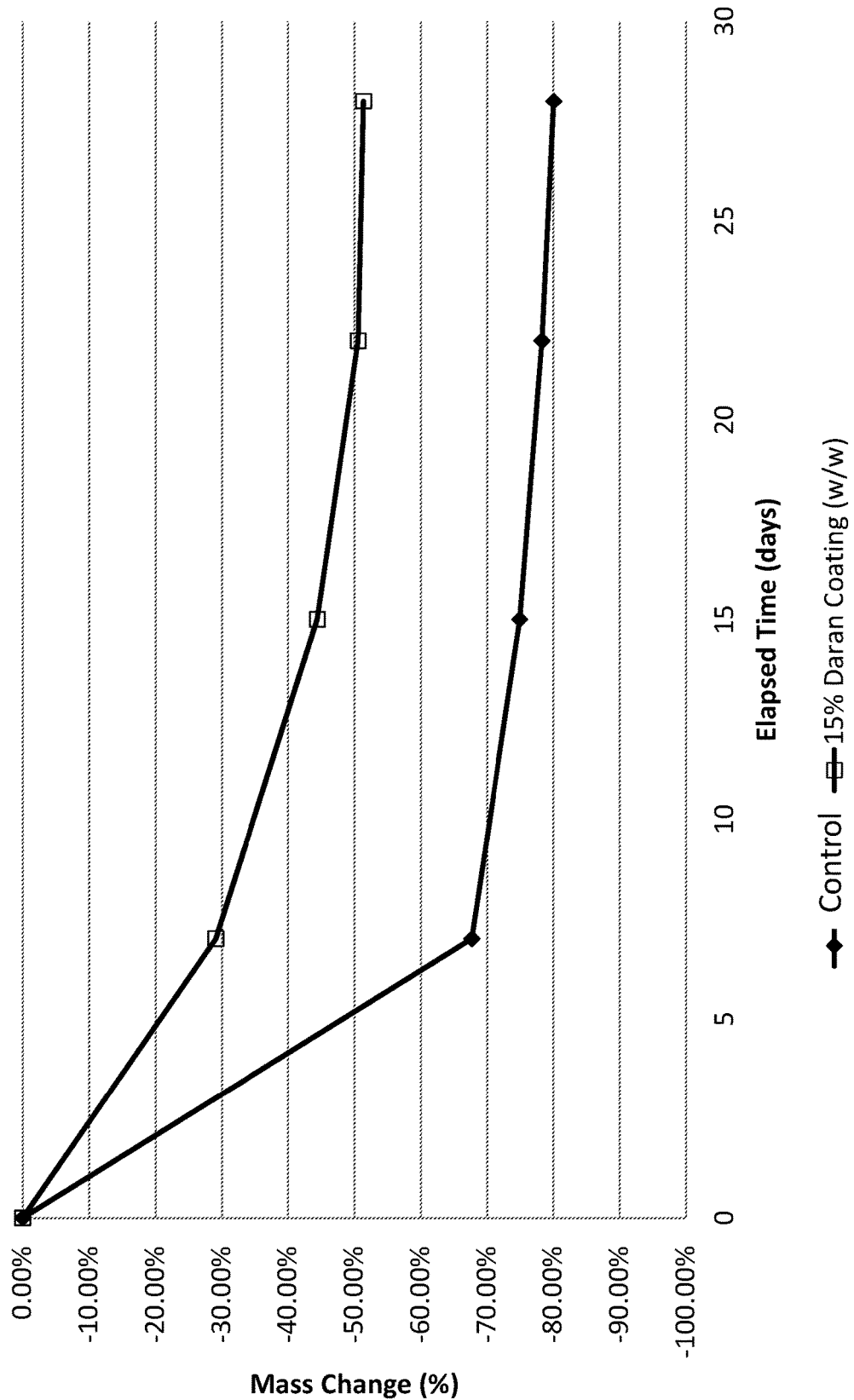
FIG. 7 is another plot showing dissolution rate of a control polyphosphate particulate and the same particulate coated with a coating according to the invention.

The procedure of Example 2 was repeated except the water source was Woodford brine (produced water from the Woodford shale region of Oklahoma) instead of deionized water. A control sample was compared to a coated particulate having 15 wt % DARAN® coating thereon. Results of dissolution studies are shown in FIG. 7. After 28 days in 300° F. brine, the control sample lost about 80 wt % of its total mass, whereas the coated sample lost slightly more than 50 wt % of its initial mass. When the measurements were normalized to account only for the weight of the polyphosphate in all samples, the coated sample lost about 60 wt % of the initial mass of polyphosphate.

Example 8

Figure 8:
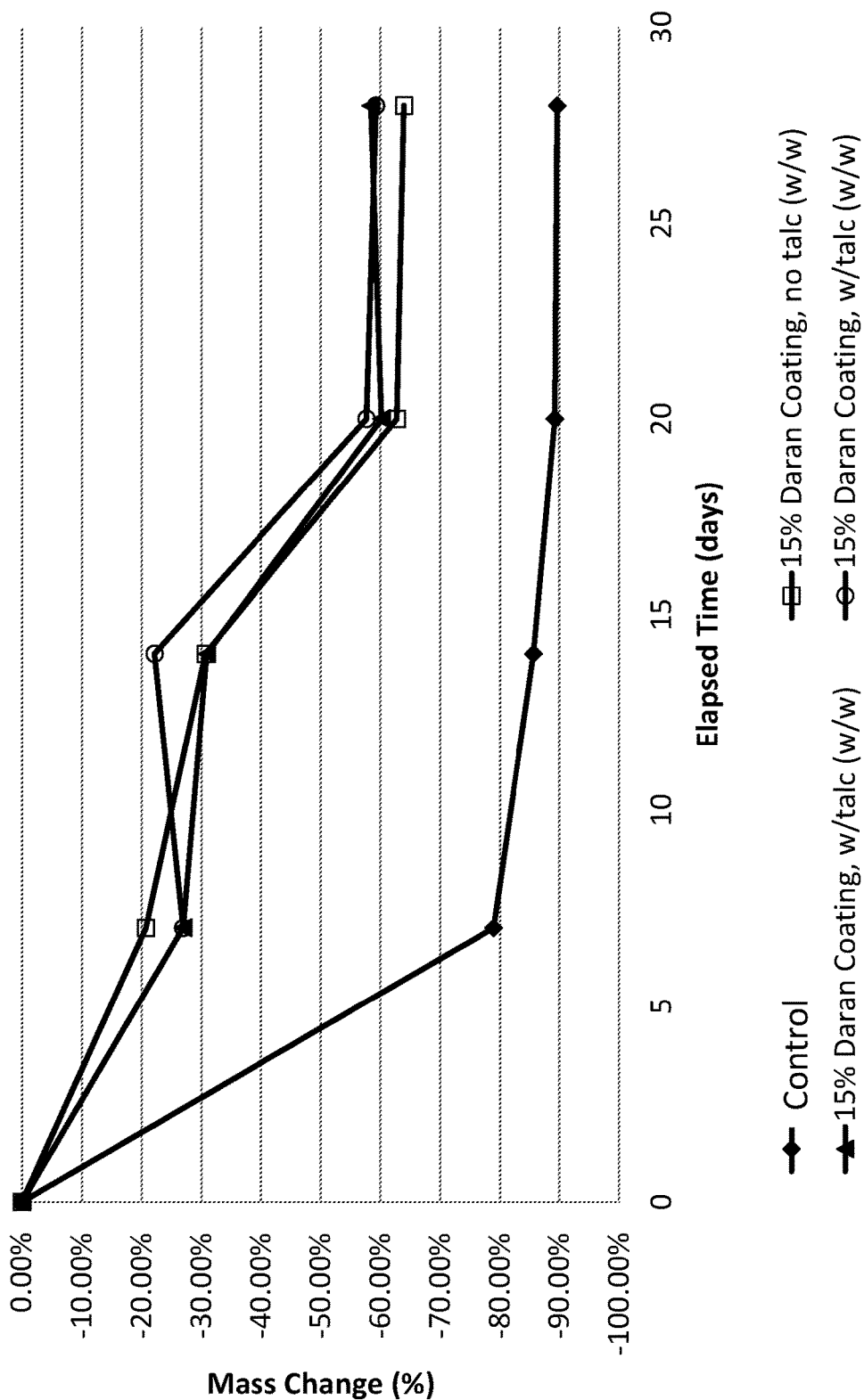
FIG. 8 is another plot showing dissolution rate of a control polyphosphate particulate and the same particulate coated with a coating according to the invention.

The procedure of Example 2 was repeated except the water source was Woodford brine (produced water from the Woodford shale region of Oklahoma) instead of deionized water and the polyphosphate particulate was initially sized to 40-70 mesh prior to coating. Some samples were further coated with talc, using the same procedure as used to coat talc on the coated particulate of Example 6. Results of dissolution studies are shown in FIG. 8. After 28 days at 300° F., the control particulate lost about 90 wt % of its initial weight, while the 15 wt % Daran coated samples (with or without talc) lost between 60 wt % and 65 wt % of the initial weight. When the measurements were normalized to account only for the weight of the polyphosphate in all samples, the coated samples lost between 70 wt % and 75 wt % of the initial mass of polyphosphate.

What is claimed is:

1. A composition comprising:
    a vitreous polyphosphate glass particulate; and
    a coating on at least a portion of the surface of the vitreous polyphosphate glass particulate, the coating comprising a water-insoluble polymer comprised of a vinylidene chloride-methyl acrylate copolymer,
    wherein the coating weight is about 5 wt % to 25 wt % of the mass of the composition, and the vitreous polyphosphate particulate has a particle size of about 10 to 30 mesh.

2. The composition of claim 1 wherein the coating weight is about 10 wt % to 20 wt % of the mass of the composition.

3. The composition of claim 1 wherein the coating is about 10 wt % to 15 wt % of the mass of the composition.

4. The composition of claim 1 wherein the coating is about 5 wt % to 15 wt % of the mass of the composition.

5. The composition of claim 1 further comprising a layer of talc on the surface of the vitreous polyphosphate glass particulate.

6. The composition of claim 3 further comprising a layer of talc on the surface of the vitreous polyphosphate glass particulate, on the surface of the coating, or on the surface of both the vitreous polyphosphate glass particulate and the coating.

7. A method of making the composition of claim 1, the method comprising
    applying the vitreous polyphosphate glass particulate to a fluidized bed reactor;
    applying the coating of the water-insoluble polymer on the surface of the vitreous polyphosphate glass particulate while the glass particulate is present in the fluidized bed to form a coated particulate;
    optionally drying the coated particulate; and
    collecting the coated particulate.

8. The method of claim 7 wherein the coating is applied as an emulsion, dispersion, or solution, followed by drying.

9. The method of claim 8 wherein the coating is applied as an aqueous emulsion.

10. The method of claim 7 wherein the coating is applied in the melt, followed by cooling.

11. The method of claim 7 wherein the method is a batchwise method, further wherein one or more portions of the coated particulate are collected while leaving one or more additional portions of the coated particulate in the fluidized bed for additional applying of water insoluble polymer.

12. The method of claim 7 wherein the vitreous polyphosphate glass particulate has a particle size of about 10 to 30 mesh.

13. An injectate composition comprising a water source and about 0.001 wt % to 10 wt % of the composition of claim 1.

14. The injectate composition of claim 13 wherein the water source is produced water.

15. The injectate composition of claim 13 further comprising a proppant.

16. The injectate composition of claim 13 wherein the composition comprises a mixture of coated particulates having different coating weights.

17. A method of treating an oil or gas well, the method comprising:
   introducing the composition of claim 1 to a well to reduce the formation of scale in a formation, in a production line downhole, or at the surface of the well.

* * * * *